Patented Aug. 5, 1947

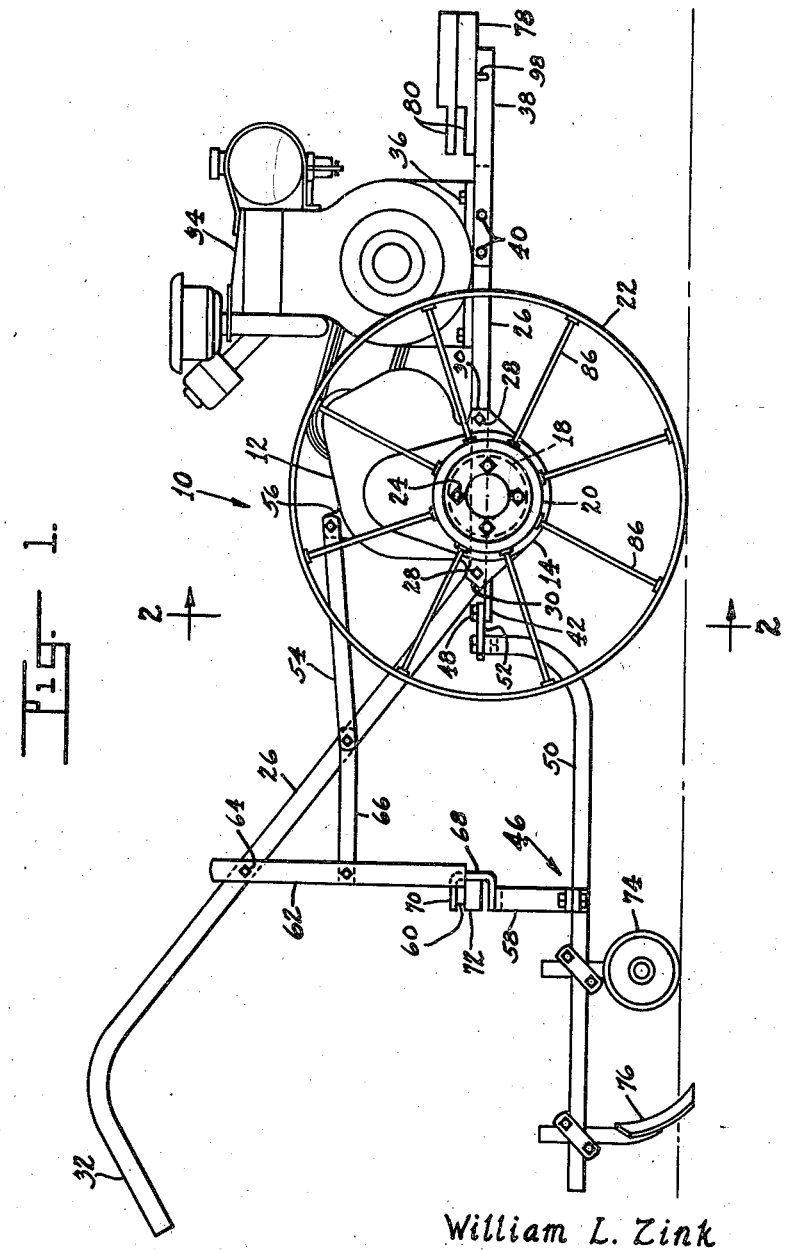

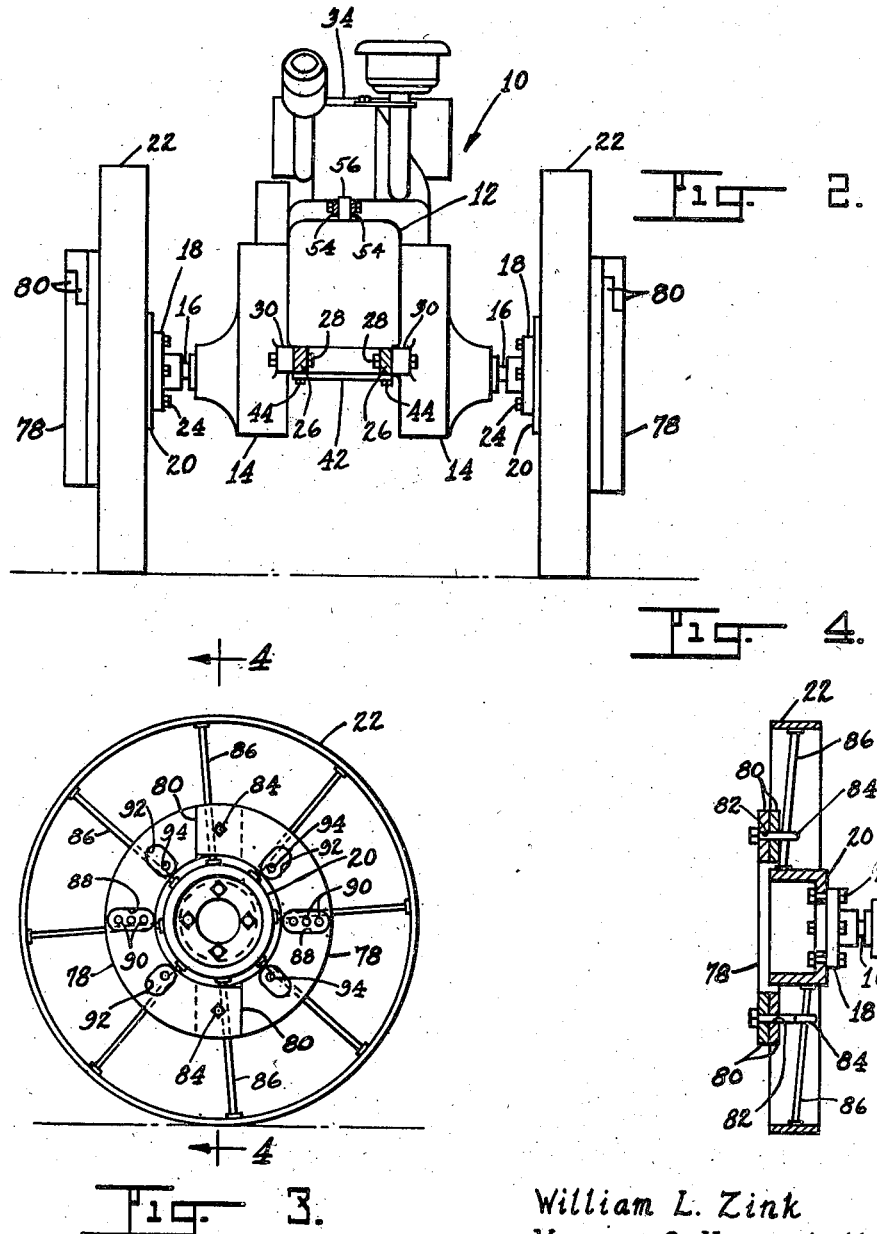

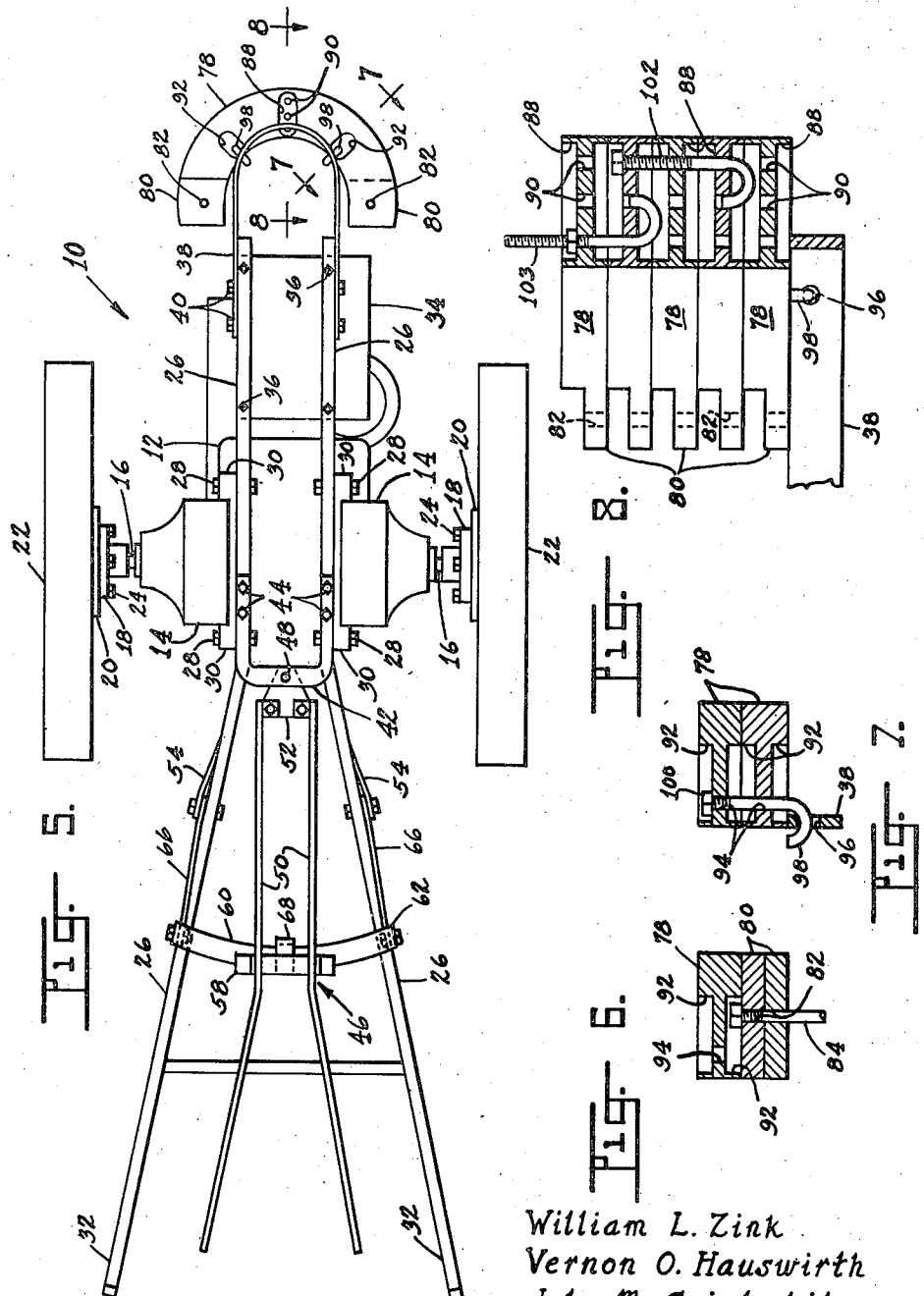

2,425,057

UNITED STATES PATENT OFFICE 2,425,057

WEIGHT CONSTRUCTION

William L. Zink, Plano, Vernon O. Hauswirth, Kankakee, and John M. Geistwhite, Chebanse, Ill., assignors to Sears, Roebuck and Co., Chicago, Ill., a corporation of New York Original application March 16, 1939, Serial No. 259,970, now Patent No. 2,307,096, dated January 5, 1943. Divided and this application January 2, 1943, Serial No. 471,170

5 Claims. (Cl. 301—41)

This is a division of our application, Serial No. 259,970, filed March 16, 1939, entitled "Weighted implement," granted January 5, 1943, as Patent No. 2,307,096.

This invention relates generally to agricultural implements, and more particularly to two wheel tractor implements adapted for having ground working tools connected therewith.

An object of this invention is to provide an improved two wheel tractor implement having novel means whereby the weight on the wheels of the tractor may be varied for increasing or decreasing the traction effect thereof.

A further object of this invention is to provide an improved two wheel tractor implement having novel means for counteracting the torque of the implement resulting from the motor, and counterbalancing the downward force exerted by the tools by reason of their working the ground.

Another object is to provide an improved two wheel tractor implement having novel means whereby a plurality of weights may be disposed thereon and shifted to different positions for varying the weight on the traction wheels and the counterbalancing effect on the implement.

A further object is to provide an improved weight having a novel construction whereby the weight may be adapted for use for the purposes intended.

Other objects and advantages will appear from the following description, reference being had to the accompanying drawings, in which:

Fig. 1 is a side elevation of a two wheel tractor implement embodying the principles of the present invention;

Fig. 2 is a vertical sectional view taken substantially along the line 2—2 of Fig. 1, weights being shown on the wheels in Fig. 2 which are not shown in Fig. 1;

Fig. 3 is an elevational view of one of the wheels and the weights attached thereto shown in Fig. 2;

Fig. 4 is a vertical sectional view taken substantially along the line 4—4 of Fig. 3;

Fig. 5 is a bottom plan view of the structure shown in Fig. 1, the tools illustrated in Fig. 1, however, not being shown;

Fig. 6 is a sectional view showing the relationship of an additional weight when attached to the paired weights illustrated in Figs. 3 and 4;

Fig. 7 is a vertical sectional view taken substantially along the line 7—7 of Fig. 5; and Fig. 8 is a vertical sectional view showing the relationship of additional weights attached to the weights shown in Fig. 7 as would result from a vertical section taken substantially along the lines 8—8 of Fig. 5.

In the embodiment selected to illustrate the invention as shown in the accompanying drawings, a tractor referred to generally by the reference character 10 is provided, comprising a transmission housing 12 containing the train of transmission gears, not shown.

The gear train in the transmission housing 12 is so arranged that the housing 12 may be provided with a pair of spaced apart depending housing portions 14 for receiving aligned axles 16 operatively connected with the gears comprising the gear train in the transmission housing.

As best shown in Fig. 2, each of the axles 16 is provided with a connecting head 18 for being secured to the hub 20 of a wheel 22 by any suitable means, such as bolts 24. Spoke type wheels have been illustrated in the drawings, but other types of wheels may be adapted for use, if so desired.

As best shown in Figs. 1, 2, and 5, a pair of frame bars 26 is provided which extends between the depending portions 14 of the transmission housing 12. Frame bars 26 are fixedly connected to the transmission housing 12 by means of bolts 28 which extend through flanges 30 integral with the housing. The frame bars 26 extend rearwardly and upwardly from the transmission housing 12 for providing a pair of handles 32 adapted for being grasped by the operator for controlling the direction of travel of the tractor.

The frame bars 26 are also extended forwardly of the transmission housing 12 for supporting an engine or motor 34 which is mounted on the frame bars 28 and connected thereto by anchor bolts 36. The engine or motor 34 provides the motive power by means of which the tractor is propelled and is operatively connected to the transmission mechanism within the transmission housing 12 by any suitable means.

The apparatus for controlling the operation of the motor 34 and the transmission mechanism disposed within the housing 12 has not been illustrated in the drawings, as the same is not pertinent to the present invention.

An extension frame 38 preferably U-shaped, as illustrated in Fig. 5, is fixedly connected to the frame bars 26 forwardly of the transmission housing 12 by any suitable means, such as bolts 40, and is adapted for supporting weights, as will hereinafter be more fully described.

A cross member 42 is positioned on the under side of the frame bar 26 somewhat rearwardly of the transmission housing 12 and is fixedly connected to the frame bars 26 by bolts 44.

An implement frame 46 on which the ground working tools are mounted is pivotally connected to the cross member 42 by means of a pivot pin 48 and comprises a pair of arms 50 connected to a plate member 52 which, in turn, receives the pivot pin 48.

As best shown in Fig. 1, a pair of brace members 54 is provided for aiding in the support of the upwardly extending portions of the frame bars 26. Each of the brace bars 54 has an end fixedly connected to a flange 56 integral with the transmission housing 12 and the other end fixedly connected to one of the frame bars 26. The implement frame 46 is supported from the frame bars 26 by means of a supporting structure which includes a carriage 58 and a track 60. The track 60 is a part of a U-shaped member 62 depending from and connected to the frame bars 26 by means of bolts 64. Brace bars 66 are connected to the frame bars 26 and the depending sides of the U-shaped member 62 for rigidly retaining the member 62 in position.

The carriage 58 is fixedly connected to the implement arms 50 and a riding element 68 positioned on the top thereof. The riding element is provided with a flange 70 which extends over the top of the track 60 and rides thereon. A roller 72 is rotatably connected to the riding element 68 and is positioned on the lower side of the track 60.

As best shown in Fig. 1, gauge wheels 74 and tools 76 may be attached to the arms 50 for working the ground. The apparatus for moving the carriage 58 on the track 60 and thereby swinging the implement frame 46 on the pivot 48 for adjustably positioning the tools relatively to the tractor wheels is not shown, inasmuch as this structure comprises no part of the present invention.

From the above description it will be noted that the present arrangement of the transmission unit, the traction wheels connected therewith, the frame bars connected to the transmission unit, and the power unit mounted on the frame bars forwardly of the transmission unit provides a complete two wheel tractor type implement.

The positioning of the ground working tools rearwardly of the wheel axis and the power unit forwardly of the wheel axis provides a two wheel power driven implement which tends to be counterbalanced, the power unit tending to counterbalance the tool supporting structure and the ground working tools connected therewith, both of which are carried by the frame bars.

The counterbalancing effect of the power unit 34 is fixed, and, consequently, the weight of the power unit may be insufficient to counteract the torque on the implement from the power unit and to counterbalance the downward force exerted on the frame bars 26 resulting from the number or types of ground working tools mounted on the arms 50 or the character of the ground being worked or cultivated.

It will be noted that when the implement is in operation and the tool 76 disposed in the ground, the torque of the motor and the resistance of the ground to the tools will tend to rotate the frame bars 26 in a counter-clockwise direction as viewed in Fig. 1. Insufficient weight for counterbalancing this effect may result in the tools continually digging deeper into the ground until the motor is unable to carry the excess load and is finally stalled. In order to provide the required weight on the front of the tractor for counteracting the motor torque and the downward force resulting from the implements connected to the rear of the tractor, and to vary the weight, depending on the number or types of implements or the ground being worked, a plurality of weights 78 is provided which are identical in construction and adapted for being mounted on the U-shaped frame extension 38 carried by the frame bars 26. The weights 78 may be detachably connected together in superimposed relationship and may be arranged in any given multiple in order that the total weight resulting from the combined weights 78 may be quickly and easily varied to provide the counterbalancing effect desired. These weights may also be connected to the wheels in any given multiple, as will hereinafter be described, and as illustrated in Figs. 2 and 3, for the purpose of providing the traction wheels with additional weight and for varying the weight thereon to meet the conditions encountered. Since the weights 78 are identical in construction, a description of one will suffice for all.

As best shown in Figs. 3 and 5, each of the weights 78 is arcuate shaped or substantially semi-circular in formation and is provided with projecting end portions 80 adapted for being disposed in overlapping relationship with the projecting end portions 80 of an adjoining weight when said weights are connected to a wheel in the position shown in Fig. 3.

The overlapping end portions 80 of the paired weights 78 disposed on the wheel, as shown in Figs. 3 and 4, are provided with aligned openings 82 therein for receiving hook bolts 84 which extend through the openings 82 and engage spokes 86 of the wheel 22 for connecting the paired weights to the wheel.

It will be noted that the projecting end portions 80 are half as thick as the remainder of the weight, so that the combined thickness of two of the overlapping end portions when connected together equals the thickness of the weight.

Each of the weights 78 is provided with a pair of recesses 88 positioned at the mid-portion of the weight and extending transversely thereof. The recesses 88 are oppositely positioned on the opposite sides of the weight and are in communication with three equally spaced holes 90 extending through the weight. Each of the weights 78 is further provided with a pair of recesses 92 similar to the recesses 88 positioned on opposite sides of the weights 78 and extending radially at substantially 45° with respect to the center line of the recesses 88.

A pair of the recesses 92 is positioned on each side of the recesses 88, each of the paired recesses being in communication with an opening 94 extending through the weight. As best shown in Figs. 1, 7, and 8, the U-shaped extension frame 38 is provided with a pair of openings 96 therein which are preferably equally spaced from the mid-portion of the U-shaped extension frame 38.

As an example in illustrating the application of the weights having the above described construction, let it be assumed that a pair of weights is to be mounted on the U-shaped frame extension as illustrated in Figs. 1, 5, and 7. In mounting the weights 78 on the frame extension 38, a pair of hook bolts 98 has the hook end portions thereof inserted through the openings 96 in the frame extension 38. A pair of the weights 78 disposed in superimposed positions is then placed on the extension frame 38 so that the hook bolts 98 extend through the aligned openings 94 in both of the weight sections 78. Nuts 100 may then be disposed on the ends of the hook bolts 98 within the topmost recesses 92 for retaining the weight sections 78 fixedly positioned on the extension frame.

When it is desired to add additional weights to those already mounted on the extension frame, the nuts 100 on the hook bolts 98 are loosened and the top weight section 78 removed. The shank of a hook bolt 102 is then inserted upwardly through the outermost opening 90 until the hook end portion thereof extends into the center hole 90, at which time the weight section may again be disposed in its former position and connected to the first weight by the bolts 98 and nuts 100, as shown in Fig. 7.

Additional weights may then be disposed on the bolt 102 throughout its length. Should it be desired to add further weights it is merely necessary to connect a hook bolt 103 to the topmost weight section 78 connected to the bolt 102 so that the shank of the hook bolt 103 extends upwardly through the aligned inner openings 90 of the last previous weight section and the additional weight sections, as clearly illustrated in Fig. 8.

Thus it will be seen that any multiple of the weight sections may be mounted on the frame extension 38 for providing the necessary counterbalancing weight.

When a pair of the weight sections 78 is connected to a wheel by the hook bolts 84, as illustrated in Figs. 3 and 4, the nuts disposed on the hook bolts will extend beyond the outer surface of the paired weight sections. In adding additional weights to the first pair of weights connected to the wheel, it is merely necessary that the first pair of additional weights be positioned so that the nuts on the hook bolts 84 may be disposed in the recesses 92 of the first pair of additional weights. The first pair of additional weights would then be disposed in the positions as would result from rotating the pair of weights, shown in Fig. 3, one-eighth of a revolution in either direction. The positioning of the weights as above described would result in a pair of diametrically opposed openings 94 of the first pair of additional weights being disposed in alignment with corresponding inner openings 90 of the first pair of weight sections connected to the wheel for receiving hook bolts and being connected to the first pair of weight sections in the manner hereinbefore described.

Another advantage results from the weight construction above described, whereby the total weight on the wheels or the front of the implement may be varied. This advantage will be readily apparent from the following illustration.

When weight sections totaling one hundred pounds are connected to the wheels, then a traction advantage will be gained in proportion to the one hundred pounds additional weight. It may be desired, however, to gain additional traction advantage which would not be practical by adding the necessary weight sections to the wheels, or the required weight sections would not be available. Let it be assumed that a traction effect of the wheels is desired which would result from weight sections amounting to one hundred fifty pounds being disposed on the wheels. In this case, weight sections amounting to fifty pounds may be removed from the wheels and mounted on the front of the implement. Assuming that the added weights on the front of the tractor substantially counterbalance the downward force exerted by the tools at the rear of the tractor, then the downward force on the wheels would be the combination of the weights on the front of the tractor and the downward force resulting from the motor torque and the tools working the ground, which would amount to substantially one hundred pounds. This one hundrel pounds, together with the fifty pounds on the wheels, would give the necessary traction effect resulting from one hundred fifty pounds of weight on the wheels.

Thus it will be seen that the weight sections are adapted for being connected to either the front of the tractor or the wheels and shifted therebetween or arranged in such multiples as will give the counterbalancing and traction effects desired.

It will also be noted that the implement is so constructed and the essential parts thereof, including the motor, the transmission, the frame bars, the tool supporting means, and the ground working tools connected therewith, so arranged, as to cooperate with the arrangements of the multiple weight sections for accomplishing the effect desired.

Modifications and changes may be made without departing from the spirit of the invention, and it is desired that the scope of the present invention be determined only by the extent of the appended claims.

We claim:

1. A weight element having uniform fundamental thickness and having alined recesses in opposite faces thereof, said recesses being separated by a partition having two spaced parallel bores therethrough communicating with said recesses, the side wall of each recess being spaced from said holes sufficiently to preclude interference of said wall with nuts on bolt shanks extending from said holes, each recess being of a depth to be capable of substantially entirely receiving such a nut when the nut is engaged with the partition, and to be capable of receiving at least one-half of the depth of the projecting bight of a J-bolt fitted in said holes, whereby two or more of said elements may be reversibly held in stacked assembly by means of one or more J-bolts without interference of the bight of any such bolt with the adjacent partition of an additional weight element coupled to the previously assembled elements.

2. A weight element having uniform fundamental thickness and having alined recesses in opposite faces thereof, said recesses being separated by a partition having two spaced parallel bores therethrough communicating with said recesses, the side wall of each recess being spaced from said holes sufficiently to preclude interference of said wall with nuts on bolt shanks extending from said holes, each recess being of a depth to be capable of substantially entirely receiving such a nut when the nut is engaged with the partition, and to be capable of receiving at least one-half of the depth of the projecting bight of a J-bolt fitted in said holes, whereby two or more of said elements may be reversibly held in stacked assembly by means of one or more J-bolts without interference of the bight of any such bolt with the adjacent partition of an additional weight element coupled to the previously assembled elements, and one or more J-bolts connecting two or more of such weight elements stacked as aforesaid.

3. A weight element having uniform fundamental thickness and having alined recesses in opposite faces thereof, said recesses being separated by a partition having two spaced parallel bores therethrough communicating with said recesses, the side wall of each recess being spaced from said holes sufficiently to preclude interference of said wall with nuts on bolt shanks extending from said holes, each recess being of a depth to be capable of substantially entirely receiving such a nut when the nut is engaged with the partition, and to be capable of receiving at least one-half of the depth of the projecting bight of a J-bolt fitted in said holes, whereby two or more of said elements may be reversibly held in stacked assembly by means of one or more J-bolts without interference of the bight of any such bolt with the adjacent partition of an additional weight element coupled to the previously assembled elements, said element having two other pairs of alined recesses with intervening partitions having bores therethrough for the reception of the shanks of J-bolts adapted to hook onto a support, each of said two other pairs of recesses being of substantially the same depth as the aforesaid recesses for the reception of nuts on bolt shanks as aforesaid.

4. A weight element having uniform fundamental thickness and having alined recesses in opposite faces thereof, said recesses being separated by a partition having two spaced parallel bores therethrough communicating with said recesses, the side wall of each recess being spaced from said holes sufficiently to preclude interference of said wall with nuts on bolt shanks extending from said holes, each recess being of a depth to be capable of substantially entirely receiving such a nut when the nut is engaged with the partition, and to be capable of receiving at least one-half of the depth of the projecting bight of a J-bolt fitted in said holes, whereby two or more of said elements may be reversibly held in stacked assembly by means of one or more J-bolts without interference of the bight of any such bolt with the adjacent partition of an additional weight element coupled to the previously assembled elements, said partition having a third hole at the same distance from one of the first two holes therein that said first two holes are from each other, whereby, when only the shank of a J-bolt is disposed in one of said first two holes, the legs of another J-bolt may be accommodated in said third hole and the other of said first two holes, so that the latter shank may serve to couple one or more additional elements to the aforesaid elements.

5. A weight element having uniform fundamental thickness and having alined recesses in opposite faces thereof, said recesses being separated by a partition having two spaced parallel bores therethrough communicating with said recesses, the side wall of each recess being spaced from said holes sufficiently to preclude interference of said wall with nuts on bolt shanks extending from said holes, each recess being of a depth to be capable of substantially entirely receiving such a nut when the nut is engaged with the partition, and to be capable of receiving at least one-half of the depth of the projecting bight of a J-bolt fitted in said holes, whereby two or more of said elements may be reversibly held in stacked assembly by means of one or more J-bolts without interference of the bight of any such bolt with the adjacent partition of an additional weight element coupled to the previously assembled elements, said partition having a third hole at the same distance from one of the first two holes therein that said first two holes are from each other, whereby, when only the shank of a J-bolt is disposed in one of said first two holes, the legs of another J-bolt may be accommodated in said third hole and the other of said first two holes, so that the latter shank may serve to couple one or more additional elements to the aforesaid elements, said element having two other pairs of alined recesses with intervening partitions having bores therethrough for the reception of the shanks of J-bolts adapted to hook onto a support, each of said two other pairs of recesses being of substantially the same depth as the aforesaid recesses for the reception of nuts on bolt shanks as aforesaid.

WILLIAM L. ZINK.
VERNON O. HAUSWIRTH.
JOHN M. GEISTWHITE.

REFERENCES CITED

The following references are of record in the file of this patent:

UNITED STATES PATENTS

| Number | Name | Date |
|---|---|---|
| 1,807,757 | Schmeiser | June 2, 1931 |
| 2,006,730 | Calkins | July 2, 1935 |
| 307,171 | Bowsher | Oct. 28, 1884 |
| 370,495 | Roy | Sept. 27, 1887 |
| 1,504,015 | Baber | Aug. 5, 1924 |
| 2,263,220 | Mejean | Nov. 18, 1941 |
| 1,487,257 | Mansfield | Mar. 18, 1924 |
| 2,090,870 | Kay | Aug. 24, 1937 |
| 2,123,861 | Shields | July 12, 1938 |